United States Patent
Ashrafzadeh et al.

(10) Patent No.: US 8,477,029 B2
(45) Date of Patent: Jul. 2, 2013

(54) MODULAR ATTRIBUTE SENSING DEVICE

(75) Inventors: Farhad Ashrafzadeh, Stevensville, MI (US); Ali R. Buendia-Garcia, Coloma, MI (US); Richard A. McCoy, Stevensville, MI (US); Yingqin Yuan, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1287 days.

(21) Appl. No.: 12/256,506

(22) Filed: Oct. 23, 2008

(65) Prior Publication Data

US 2010/0102959 A1    Apr. 29, 2010

(51) Int. Cl.
*G08B 1/00* (2006.01)
*G08B 17/00* (2006.01)

(52) U.S. Cl.
USPC ........ 340/540; 340/572.1; 340/621; 340/622; 340/623; 340/624; 340/625; 340/626; 340/627

(58) Field of Classification Search
None
See application file for complete search history.

(56) References Cited

U.S. PATENT DOCUMENTS

| | | | |
|---|---|---|---|
| 4,605,297 A * | 8/1986 | Livingston et al. | 396/582 |
| 4,939,705 A | 7/1990 | Hamilton et al. | |
| 4,998,824 A * | 3/1991 | Littlejohn et al. | 356/407 |
| 5,008,661 A | 4/1991 | Raj | |
| 5,014,798 A | 5/1991 | Glynn | |
| 5,187,744 A | 2/1993 | Richter | |
| 5,305,381 A | 4/1994 | Wang et al. | |
| 5,448,220 A * | 9/1995 | Levy | 340/539.26 |
| 5,457,745 A | 10/1995 | Wang | |
| 5,836,563 A | 11/1998 | Hsin-Yung | |
| 5,852,590 A | 12/1998 | de la Huerga | |
| 5,905,653 A | 5/1999 | Higham et al. | |
| 5,983,198 A * | 11/1999 | Mowery et al. | 705/22 |
| 6,137,413 A | 10/2000 | Ryan, Jr. | |
| 6,243,613 B1 | 6/2001 | Desiraju et al. | |
| 6,259,654 B1 | 7/2001 | de la Huerga | |
| 6,341,271 B1 | 1/2002 | Salvo et al. | |
| 6,529,446 B1 | 3/2003 | de la Huerga | |
| 6,634,279 B2 * | 10/2003 | D'Antonio et al. | 99/285 |
| 6,735,497 B2 | 5/2004 | Wallace et al. | |

(Continued)

FOREIGN PATENT DOCUMENTS

| | | |
|---|---|---|
| EP | 0510686 B1 | 7/1997 |
| EP | 1650536 A2 | 4/2006 |

(Continued)

OTHER PUBLICATIONS

Definition of "Appliance" Retrieved from Merrium-Webster's Medical Dictionary, 2007.

(Continued)

*Primary Examiner* — Julie Lieu
(74) *Attorney, Agent, or Firm* — Clifton G. Green; McGarry Bair PC

(57) ABSTRACT

A modular device for determining attributes of a substance stored in a container having a sensing module, a transmitter module and a power source module. The sensing module is capable of sensing attributes of a substance and providing an output. The transmitter module is configured to transmit an output of the at least one sensing module when operably coupled to the sensing module. The power source module is capable of being operably connected to the sensor module and the transmitter module to power the sensor module and the transmitter module.

45 Claims, 11 Drawing Sheets

U.S. PATENT DOCUMENTS

| | | |
|---|---|---|
| 6,751,730 B1 | 6/2004 | Walker et al. |
| 6,785,567 B2 | 8/2004 | Kato |
| 6,859,745 B2 | 2/2005 | Carr et al. |
| 6,879,876 B2 | 4/2005 | O'Dougherty et al. |
| 6,888,940 B1 | 5/2005 | Deppen |
| 6,966,533 B1 | 11/2005 | Kalis et al. |
| 6,996,538 B2 | 2/2006 | Lucas |
| 7,061,380 B1 | 6/2006 | Orlando et al. |
| 7,080,812 B2 | 7/2006 | Wadsworth et al. |
| 7,130,814 B1 | 10/2006 | Szabo et al. |
| 7,158,092 B2 | 1/2007 | Shen |
| 7,190,750 B2 | 3/2007 | Teague et al. |
| 7,224,273 B2 | 5/2007 | Forster |
| 7,292,993 B2 | 11/2007 | Uzzo et al. |
| 7,342,501 B2 | 3/2008 | Abbott |
| 7,366,675 B1 | 4/2008 | Walker et al. |
| 7,388,506 B2 | 6/2008 | Abbott |
| 7,479,887 B2 | 1/2009 | Meyer |
| 7,486,188 B2 | 2/2009 | Van Alstyne |
| 7,495,561 B2 | 2/2009 | Bodin et al. |
| 7,663,497 B2 | 2/2010 | Chishima et al. |
| 7,673,464 B2 | 3/2010 | Bodin et al. |
| 7,693,603 B2 | 4/2010 | Higham |
| 7,715,277 B2 | 5/2010 | de la Huerga |
| 7,761,319 B2 | 7/2010 | Gil et al. |
| 7,766,242 B2 | 8/2010 | Lunak et al. |
| 7,772,981 B1 | 8/2010 | Lambert et al. |
| 7,801,745 B2 | 9/2010 | Walker et al. |
| 7,821,404 B2 | 10/2010 | Walker et al. |
| 7,844,509 B2 | 11/2010 | Bodin et al. |
| 7,887,755 B2 | 2/2011 | Mingerink et al. |
| 7,894,938 B1 | 2/2011 | Arora et al. |
| 7,930,060 B2 | 4/2011 | Yuyama et al. |
| 7,933,733 B2 | 4/2011 | Ashrafzadeh et al. |
| 7,937,289 B2 | 5/2011 | Bodin et al. |
| 7,961,104 B2 | 6/2011 | Bodin et al. |
| 7,978,564 B2 | 7/2011 | De La Huerga |
| 7,991,507 B2 | 8/2011 | Liff et al. |
| 7,999,679 B2 | 8/2011 | Van Alstyne |
| 8,006,903 B2 | 8/2011 | Braun et al. |
| 8,032,430 B2 | 10/2011 | Bodin et al. |
| 8,055,509 B1 | 11/2011 | Walker et al. |
| 8,069,056 B2 | 11/2011 | Walker et al. |
| 8,120,484 B2 | 2/2012 | Chisholm |
| 2002/0027507 A1 | 3/2002 | Yarin et al. |
| 2002/0116509 A1 | 8/2002 | DeLaHuerga |
| 2002/0183883 A1 | 12/2002 | Carr et al. |
| 2003/0099158 A1 | 5/2003 | De la Huerga |
| 2003/0174554 A1 | 9/2003 | Dunstone et al. |
| 2003/0216831 A1 | 11/2003 | Hart et al. |
| 2004/0030532 A1 | 2/2004 | Boldt et al. |
| 2004/0100380 A1 | 5/2004 | Lindsay et al. |
| 2004/0103144 A1 | 5/2004 | Sallam et al. |
| 2004/0124988 A1 | 7/2004 | Leonard et al. |
| 2004/0254862 A1 | 12/2004 | Luo et al. |
| 2005/0051624 A1 | 3/2005 | Kipp et al. |
| 2006/0012481 A1* | 1/2006 | Rajapakse et al. ......... 340/572.1 |
| 2006/0015414 A1 | 1/2006 | Congram et al. |
| 2006/0019135 A1* | 1/2006 | Curello et al. ................. 429/22 |
| 2006/0049948 A1 | 3/2006 | Chen et al. |
| 2006/0064257 A1* | 3/2006 | Pennington et al. ............ 702/50 |
| 2006/0119484 A1* | 6/2006 | Chishima et al. ............. 340/612 |
| 2006/0285441 A1 | 12/2006 | Walker et al. |
| 2007/0192715 A1 | 8/2007 | Kataria et al. |
| 2008/0041947 A1 | 2/2008 | Hollister et al. |
| 2008/0059338 A1 | 3/2008 | Hubbard |
| 2008/0173668 A1* | 7/2008 | Bloechlinger et al. ............ 222/1 |
| 2008/0186136 A1 | 8/2008 | Raphaeli et al. |
| 2008/0211674 A1 | 9/2008 | Gibson et al. |
| 2009/0317311 A1* | 12/2009 | Cocking et al. ............... 422/261 |
| 2010/0007464 A1* | 1/2010 | Mctigue ..................... 340/10.1 |
| 2010/0161140 A1 | 6/2010 | Doglioni Majer |
| 2010/0241277 A1 | 9/2010 | Humphrey |
| 2010/0253519 A1* | 10/2010 | Brackmann et al. ....... 340/572.1 |
| 2010/0326283 A1* | 12/2010 | Evers et al. .................... 99/295 |

FOREIGN PATENT DOCUMENTS

| | | |
|---|---|---|
| EP | 1777467 A1 | 4/2007 |
| EP | 1810598 A1 | 7/2007 |
| JP | 7218320 A | 8/1995 |
| JP | 2001264146 A | 9/2001 |
| JP | 2001264147 A | 9/2001 |
| JP | 2002291844 A | 10/2002 |
| JP | 2004283248 A | 10/2004 |
| JP | 2008216165 A | 9/2008 |
| SK | 284643 B6 | 8/2005 |
| WO | 99/01971 A1 | 1/1999 |
| WO | 02100728 A2 | 12/2002 |
| WO | 03101022 A2 | 12/2003 |
| WO | 2005093377 A2 | 10/2005 |
| WO | 2006/126818 A1 | 11/2006 |

OTHER PUBLICATIONS

Definition of "Ingredient" Retrieved from Collins English Dictionary, Complete & Unabridged 10th Edition, 1979.

Npl—Definition of "Foodstuff" Retrieved from Collins English Dictionary, William Collins & Co., 2007.

Definition of "On" as "In Contact or Connection with the Surface of" as defined in World English Dictionary, 1998, Williams Collins Sons & Co.

* cited by examiner

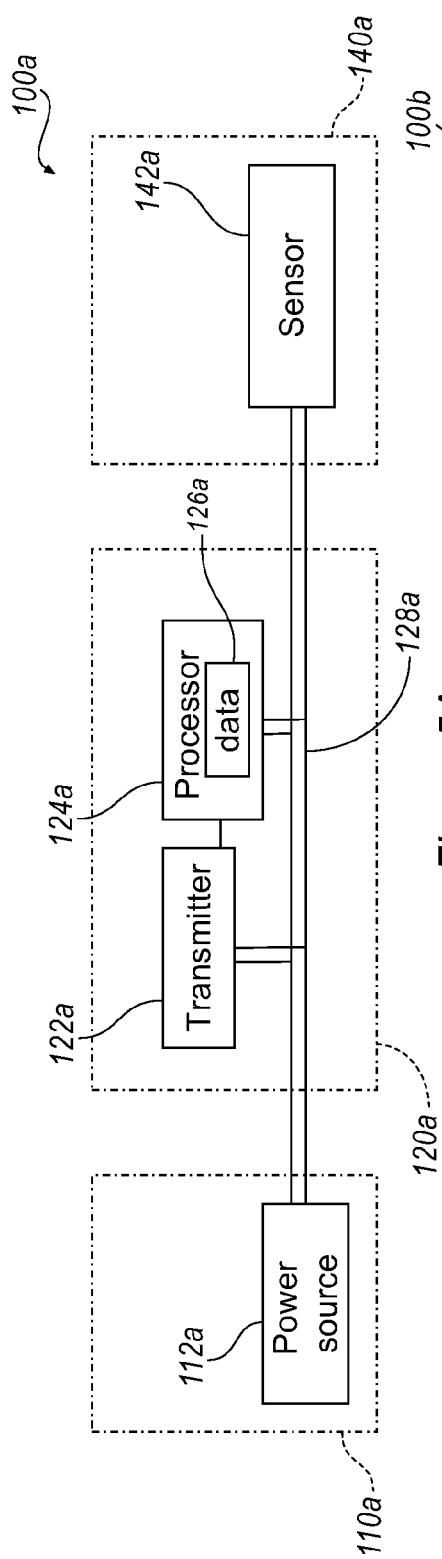
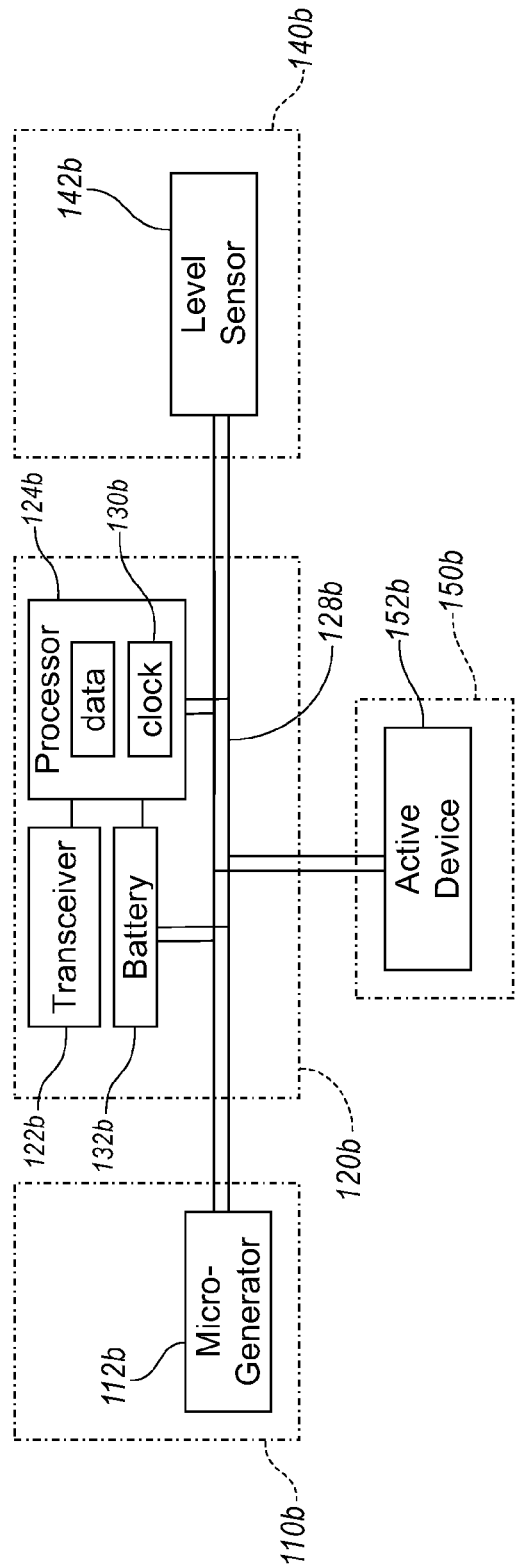
*Figure 5A*
*Figure 5B*

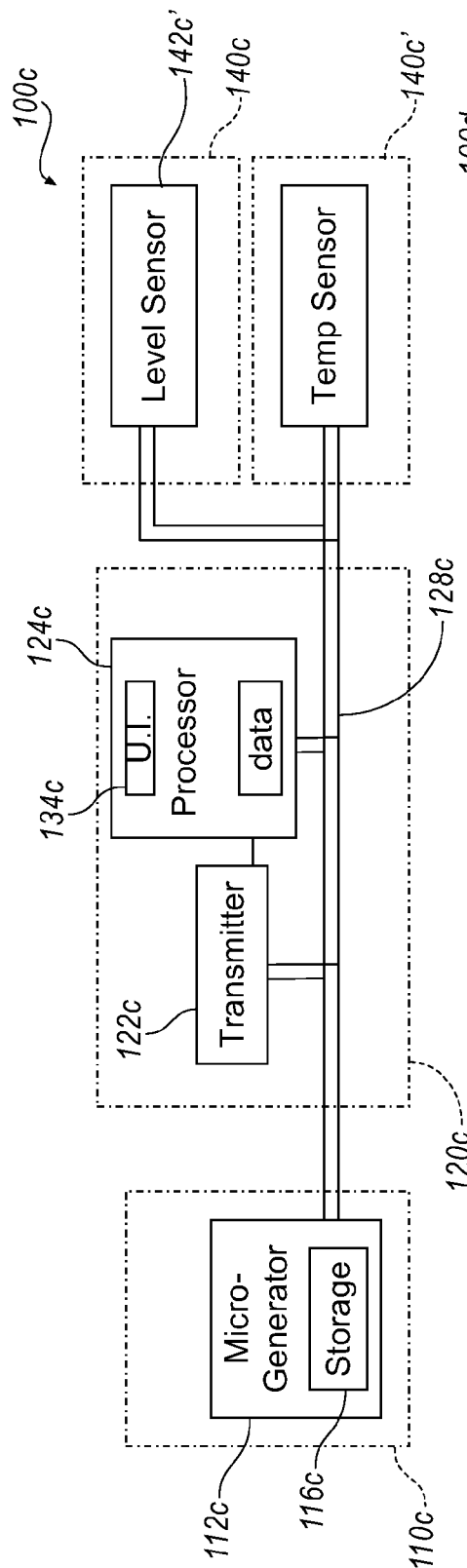
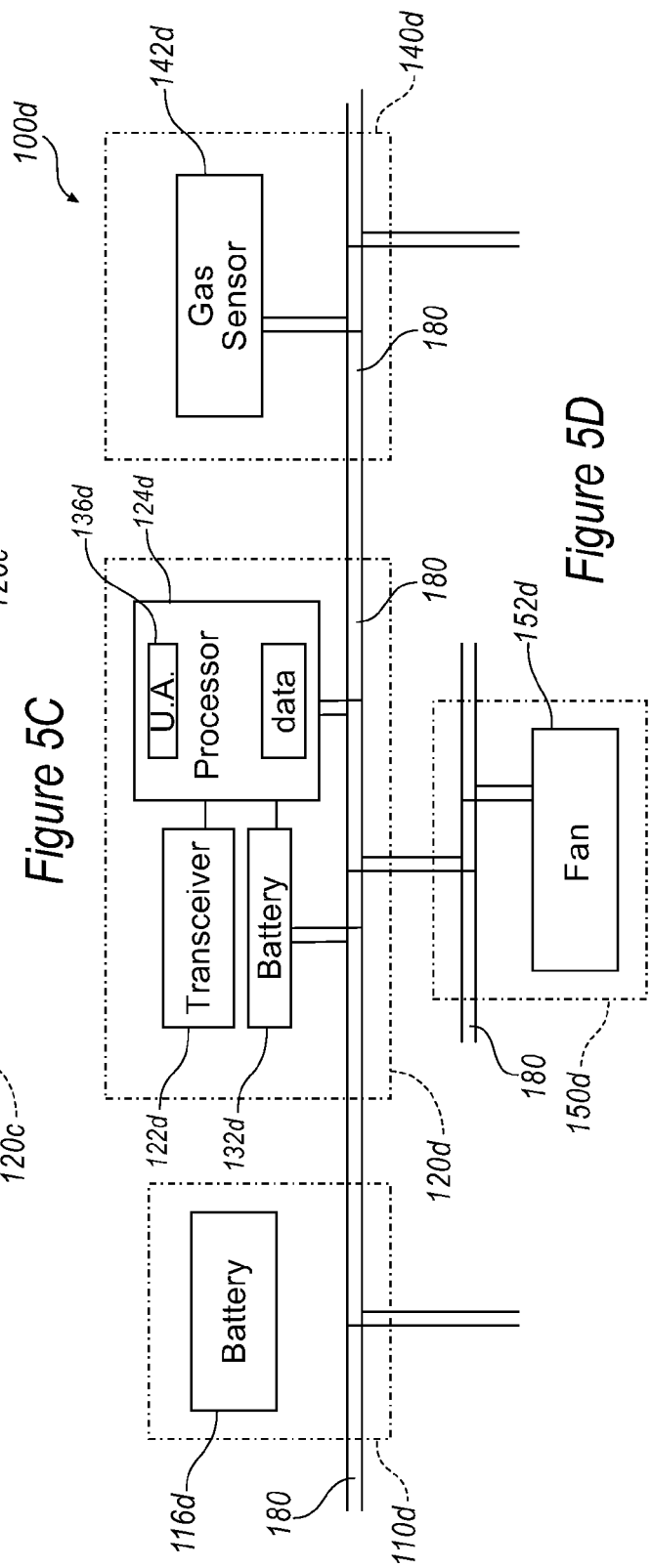
Figure 5C
Figure 5D

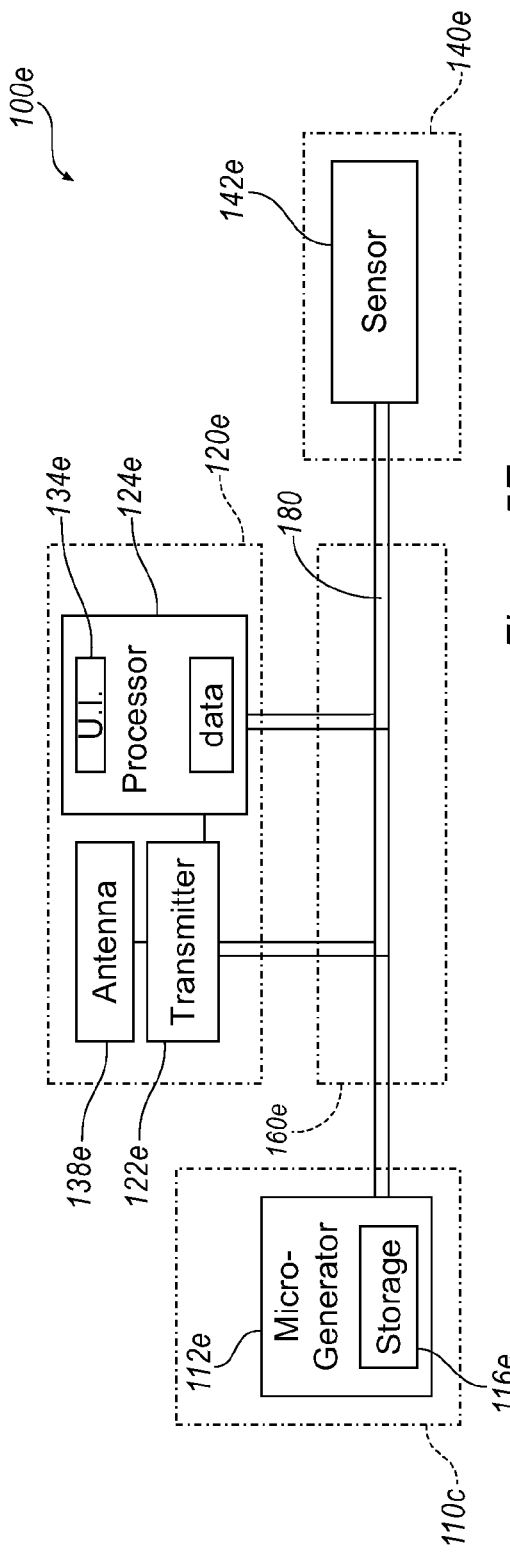
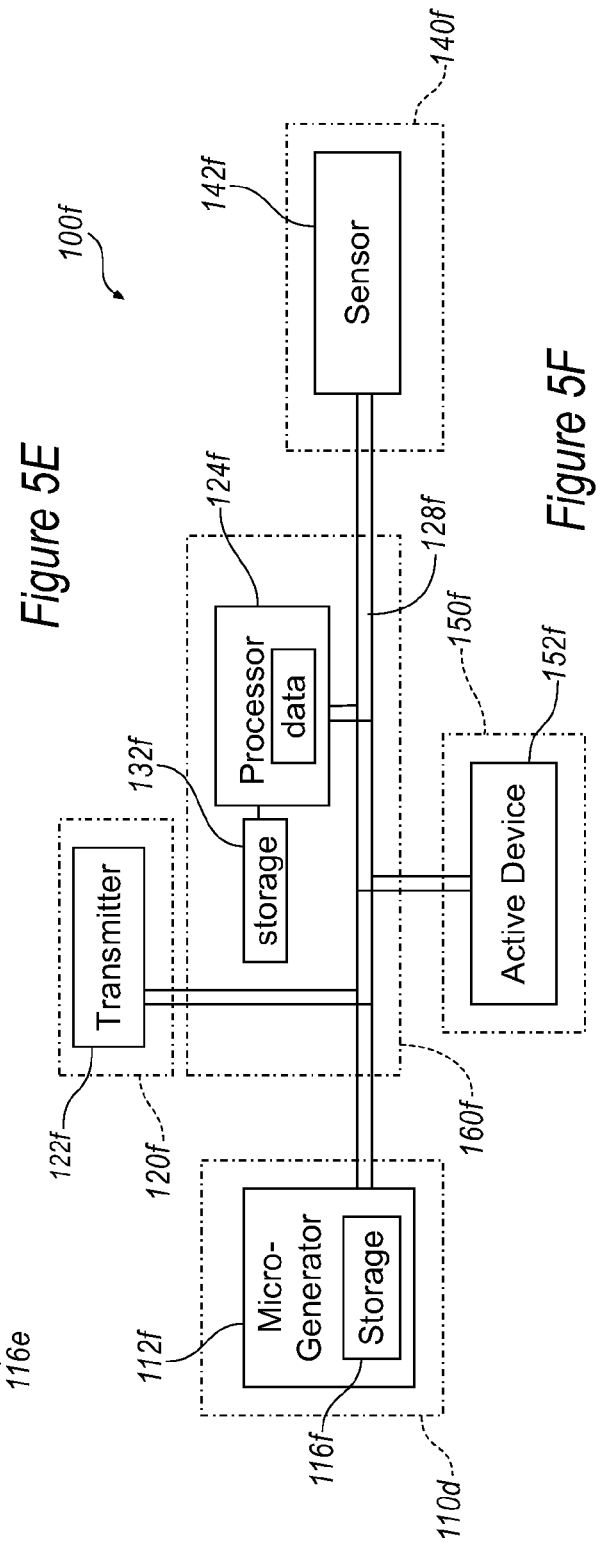
Figure 5E
Figure 5F

MODULAR ATTRIBUTE SENSING DEVICE

TECHNICAL FIELD

The invention relates to a modular device, capable of being included within a container, for sensing, maintaining, and affecting attributes of the contents stored therein.

BACKGROUND

Substances stored in containers may have properties or attributes associated therewith such as weight, volume, color, texture, outgases, pressure, and temperature. Depending on the substance and the attributes being observed, these attributes may remain constant over time even given varying environmental conditions or may vary over time or as result of specific conditions. Many other substances, especially perishable substances, may have attributes that change over time and change due to varied environmental conditions in a manner that indicates their suitability or unsuitability for an intended purpose.

Certain changes to the attributes of a substance may indicate that the substance will soon be unsuitable or is now unsuitable for its intended purpose. Changes in certain other attributes, such as weight or volume, may indicate information about the rate at which the substance is being consumed or may be indicative of a need to replenish the substance. Still other changes in attributes may be indicative that a substance that required some active or passive processing before it would be suitable for some purpose has completed the process.

When storing a substance in a container, it may be difficult or time consuming to ascertain whether the attributes of the substance have changed. A sample of the substance may have to be removed from the container prior to testing the attributes for any changes or a measurement device may have to be manually inserted into each container to measure an attribute. Such a task may be problematic if the container is inaccessible or if a large number of containers and readings are required. It may be impossible or prohibitively expensive to accomplish the task. Additionally, simply opening the container to remove a sample or to measure an attribute may unfavorably alter the environmental conditions of the substance and may accelerate its loss of a desirable quality over time. Even if the information may be readily obtained from container, it may not be available when needed, such as during a shopping trip to replenish supplies.

Furthermore, the environmental conditions inside containers are affected and determined by the environmental conditions outside of the container and the characteristics of the container and any sealing feature of the container. It may be advantageous to alter environmental conditions within the container when certain attributes of the substance change or at certain times in the life cycle of the substance. It may also be advantageous to alter the environmental conditions within the container when the environmental conditions outside of the container change. Such alterations to environmental conditions may involve temperature, pressure or humidity changes, imparting mechanical energy to the substance, or providing chemical additives to the environment within the container.

It may further be advantageous to observe an attribute of the substance before, after and/or during the alteration of the environmental conditions within the container. For instance, testing may reveal that an environmental alteration process may need to be activated on a periodic basis. However, such a periodic process may have varying results and may be better regulated if the device driving the process is able to regulate the process as different conditions arise, which conditions might be detected by a sensor detecting an attribute of the substance.

Additionally, there are a wide variety of containers, substances and intended uses for substances. Non-modular sensors/controls may not be suitable for multiple containers/substances, since they may lack versatility and use across multiple applications. There are a wide variety of attributes that may be observed, depending on the substance, its intended use, and the needs and preferences of the user. Even where the same attribute is of interest, such as amount of substance, different measurement techniques may be appropriate depending upon whether the substance is a liquid, a powder or collection of larger solid objects, such as medicinal pills. There are a wide variety of ways in which the environment within a container may be modified, depending on the life cycle of the substance and the environment in which the substance is stored.

BRIEF SUMMARY

An exemplary device for determining attributes of a substance stored in a container may include at least one sensing module associated with the container, a transmitter operably connected to the sensing module and configured to transmit an output of the sensor, and a power source module operably connected to the sensor module.

According to another exemplary device, a modular device for determining attributes of a substance in a container includes a sensing module, a transmitter module and a power source module. The sensing module is capable of sensing an attributes of a substance and providing an output. The transmitter module is configured to transmit an output of the at least one sensing module when operably coupled to the sensing module. The power source module is capable of being operably connected to the sensor module and the transmitter module to power the sensor module and the transmitter module.

An exemplary modular system for determining attributes of substances in containers includes a plurality of sensing modules and power source modules and at least one transmitter module. Each of the plurality of sensing modules has a different type of sensor capable of sensing an attribute of a substance in a container. Each of the at least one transmitter modules is capable of being operably connected to any of the sensing modules and is configured to transmit an output of the sensor of the sensing module to which it is operably connected. Each of the plurality of power source modules is capable of being operably connected to any of the sensor modules and the transmitter modules to power the sensor module and the transmitter module to which it is operably connected.

The present invention will be more fully understood upon reading the following detailed description in conjunction with the accompanying drawings.

BRIEF DESCRIPTION OF THE DRAWINGS

In the drawings:

FIG. 5A through 5F are schematic views of alternative modular devices for sensing attributes of substances in containers.

DETAILED DESCRIPTION

Figure 1:
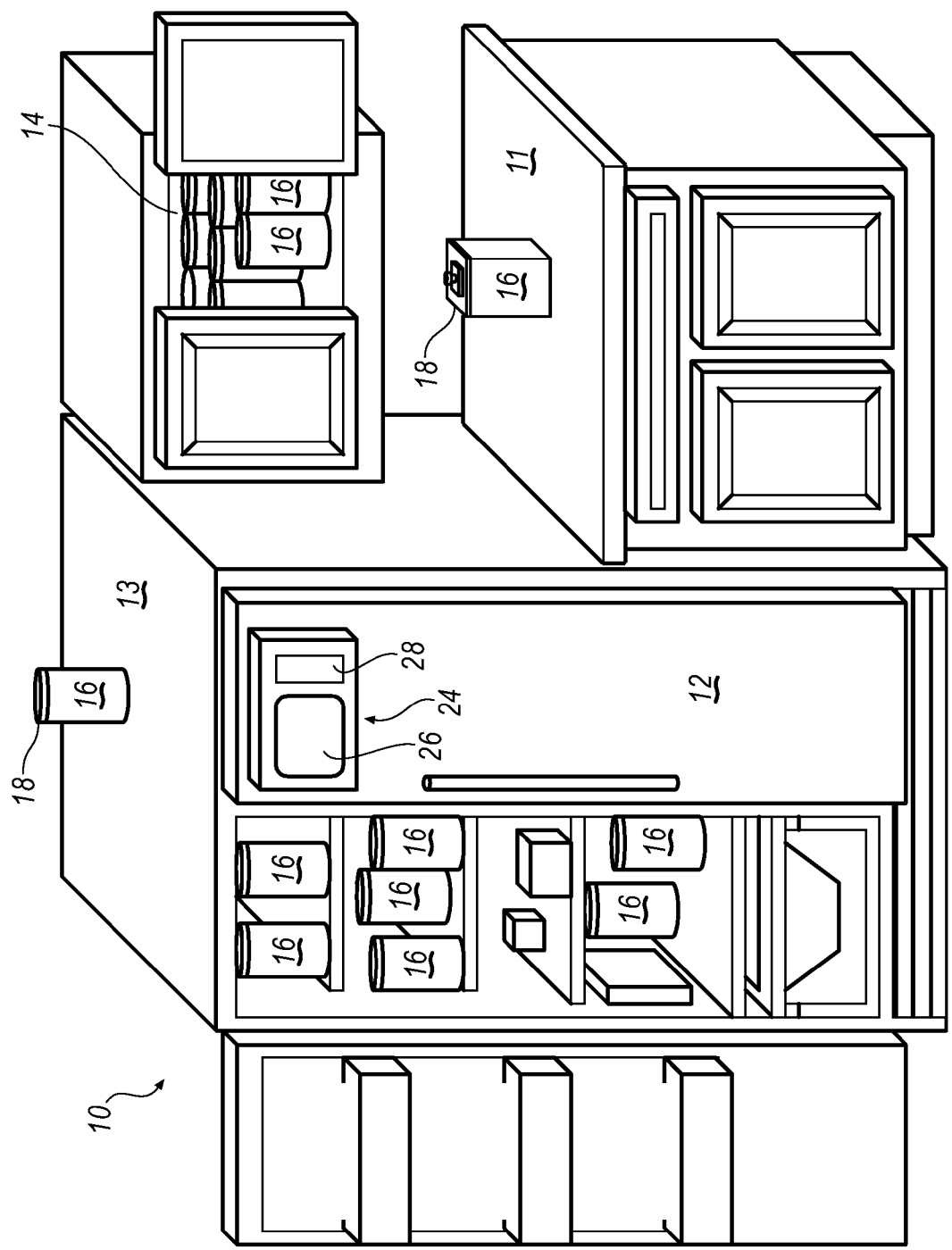
FIG. 1 is a perspective partial view of a storage and consumption environment and in particular depicts a kitchen including a refrigerator and cabinets each holding numerous containers.

Referring now to the drawings, preferred embodiments of the present invention are shown in detail. Although the drawings represent embodiments of the present invention, the drawings are not necessarily to scale and certain features may be exaggerated to better illustrate and explain the present invention. The embodiments set forth herein are not intended to be exhaustive or otherwise limit the invention to the precise forms disclosed in the following detailed description.

The drawings and the below detailed description relate generally to devices for detecting attributes of substances.

As used herein, a substance is any useful material that can be stored in a container. A consumable substance is a substance that may be stored in varying amounts in containers and may be partially dispensed or removed from the container over a period of time. An attribute of a substance is any information about a substance, including measurable and non-measurable information about the substance that can be stored for later retrieval, including but not limited to its physical or chemical properties, its impact upon its environment, and its amount.

Non-measurable attributes are attributes about the substance that may be stored with the substance or with the container of the substance, whether the attributes would or would not have been measurable by an appropriate sensor. Examples of non-measurable attributes include quantity of consumable pieces, quantity by volume or by weight, date of manufacture, manufacturer, data about its transit from manufacturer, distributor, market, and consumer, data about the temperature during transit, nutritional information like calories, fat grams, % daily allowance of essential vitamins and minerals, a list of medical conditions under which a consumable should not be consumed, data about the relationship between the Consumable Meta Data and known diets, known medical conditions, and known reactions to known medications, and the like.

Amount attributes are attributes directly reflecting the amount of the substance available for future use including weight, volume, mass, height, and count. An attribute indicative of the amount are attributes that may be used or processed to infer or calculate the amount of substance, such as the vapor pressure in a container, the light tranasmissivity or electrical inductance, capacitance, resistance, reactance, or impedance of the substance. An attribute of the environment is any characteristic of the environment inside of the container, the environment outside of the container, or of the container itself.

As used herein, information or data includes any stored information, such as genealogical and life cycle information, relating to the substance, the container, the manufacturer, the environment, the user or users. Information may be measurable or non-measurable, event based, historical, or identifier information.

Since there can be a plurality of containers, each with a substance, there may need to be a unique identifier identifying each container or each substance that may be paired with an attribute measurement of a substance so that the value of the measurement can be uniquely identified per its meaning at a later time and by subsequent intelligent processes. Such identifier may be associated with the substance, the container, the sensor, or the transmitter and such association may occur at the time of creation or assembly of the components, the time of first adding substance to the container, or the time of introducing the container to a system using a plurality of containers. The identifier may also be dynamically generated, for example, for one or more measurable and non-measurable attributes.

Similarly, since there may be a plurality of attributes applicable to a substance, attributes may need to be uniquely identifiable so that when a collection of attributes each having a value is either stored or transmitted, each respective value is paired with its attribute identifier so that the value can be uniquely identified per its meaning at a later time and by a subsequent intelligent process. In the simplest case, where there is only an amount attribute, the system may assume that all values are amount values with an inherent attribute identifier with the meaning of amount.

A container of substance is any container capable of temporarily holding an amount of substance. A lid is a feature of any container which may be opened to permit or improve access to the substance in the container. A dispenser is any feature of a container which permits or drives the active or passive filling of substance into the container or which permits or drives the active dispensing of substance from the container. A main body of a container is any portion of the container which is not a lid or dispenser. A portable container is a container that is intended to be periodically manually moved within a use environment during its lifetime.

A sensor is any active or passive device capable of obtaining information in a form which may be either actively or passively communicated to another device for use by the other device. A communication of information is the delivery of information from a first device to a second device either by the active transmission from the first device to the second device or by the reading of the second device by the first device. A transmitter is any device which wirelessly communicates information to other devices using any form of active or passive transmission including optical or electromagnetic waves.

A triggering event is an event used as an input by a system to begin a process. An access device of a container is any feature of a container that permits access to the substance, including any lid or dispenser. An access event relating to a container of substance is any event indicative of accessing the substance in a container such as an opening, closing, dispensing or filling event. A local event, device, process or step is an event, device, process or step existing or occurring in or about the container. A remote event, device, process or step is an event, device, process or step existing or occurring remote from the container. A notification is specific information derived from a system which is a value to a user or to an observing computer program on a remote device. A notification event is an event resulting in the immediate availability of information to a user or the delivery of information to a user, such as audible announcement, a visible display on a user interface, a communication to phone or other portable consumer electronic device, or a notification message either broadcast on at least one computer network or directed to at least one computer containing a software component configured to receive the notification.

Power and energy include any form of power or energy usable by a device for performing an operation and includes electrical, mechanical, thermal, solar and chemical power. A power generator is any device capable of generating a usable form of power or energy. A power converter is any device capable of converting one form of power to another such as converting chemical power to electrical power, or converting AC electrical power to DC electrical power Referring to FIG. 1, a storage and consumption environment 10 such as a kitchen, medical center, a pharmaceutical facility, a manufacturing facility or research laboratory, may include storage compartments such as a refrigerator 12 and cabinetry 14 as well as additional cupboards, drawers, pantries and free standing storage furniture, not shown. The storage and consumption environment 10 may also include processing compartments such as ovens, not shown. The storage and consumption environment 10 may further include open storage and use areas such as countertop 11 and the top surface 13 of the refrigerator 12 as well as open shelves, tables, ranges, and cook tops, not shown.

The manufacture of containers 16 which can self-report data about their contents is contemplated. Specific embodiments of self-reporting containers 16, as well as some additional related components, methods and features will now be described. Other examples of self-reporting containers are described in the following related applications filed concurrently herewith: U.S. patent application Ser. No. 12/256,507 entitled "LID BASED AMOUNT SENSOR", , U.S. patent application Ser. No. 12/256,490 entitled "METHOD OF INVENTORY MANAGEMENT," U.S. patent application Ser. No. 12/256,491 entitled "ATTRIBUTE SENSING PROCESSES," now U.S. Pat. No. 7,933,733, U.S. patent application Ser. No. 12/256,492 entitled "SYSTEM AND METHOD FOR TRACKING INVENTORY HISTORY," now abandoned, U.S. patent application Ser. No. 12/256,498 entitled "INVENTORY COMPONENT ACTIVATION," now abandoned, U.S. Patent application Ser. No. 12/256,495 entitled "CONSUMABLES INVENTORY MANAGEMENT METHOD," U.S. patent application Ser. No. 12/256,500 entitled "INTRODUCTION OF A SELF-REPORTING PORTABLE CONTAINER INTO AN INVENTORY SYSTEM," and U.S. patent application Ser. No. 12/256,502 entitled "INTRODUCTION AND ACTIVATION OF A SELF-REPORTING PORTABLE CONTAINER INTO AN INVENTORY SYSTEM," each of which is incorporated herein by reference in its entirety.

A plurality of containers 16 is distributed around the storage and consumption environment 10. Some containers 16 may be enclosed in a storage unit, such as a refrigerator 12 or in the cabinetry 14, or may be in an unconfined location, such as the countertop 11 or on the top surface 13 of the refrigerator. Containers 16 generally include a lid 18 for enclosing a substance 20 being contained. As shown in the drawing, containers 16 may, for example, be glass jars 16' with twist off lids 16' or tins 16" with pull-off lids 18". Alternatively, containers 16 may be of various other types, including plastic tubs with snap-off covers, boxes with attached movable interlocking cover flaps, covered pots or pans, medicine bottles, and dispenser storage compartments, not shown.

Figure 2:
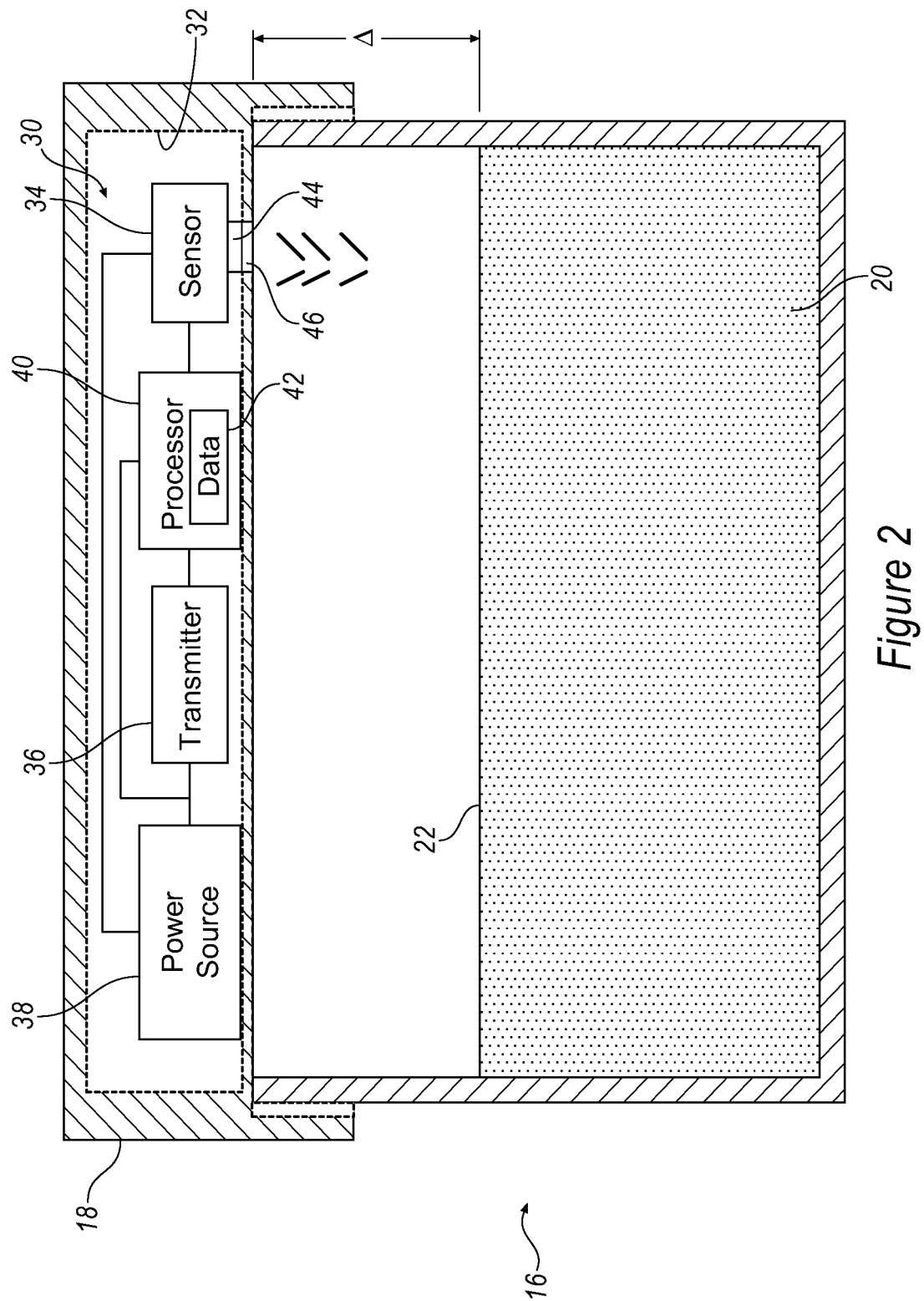
FIG. 2 is a partially schematic side, cut away view of a container containing a substance with a device to measure an attribute of the substance mounted to the lid of the container.
Figure 2A:
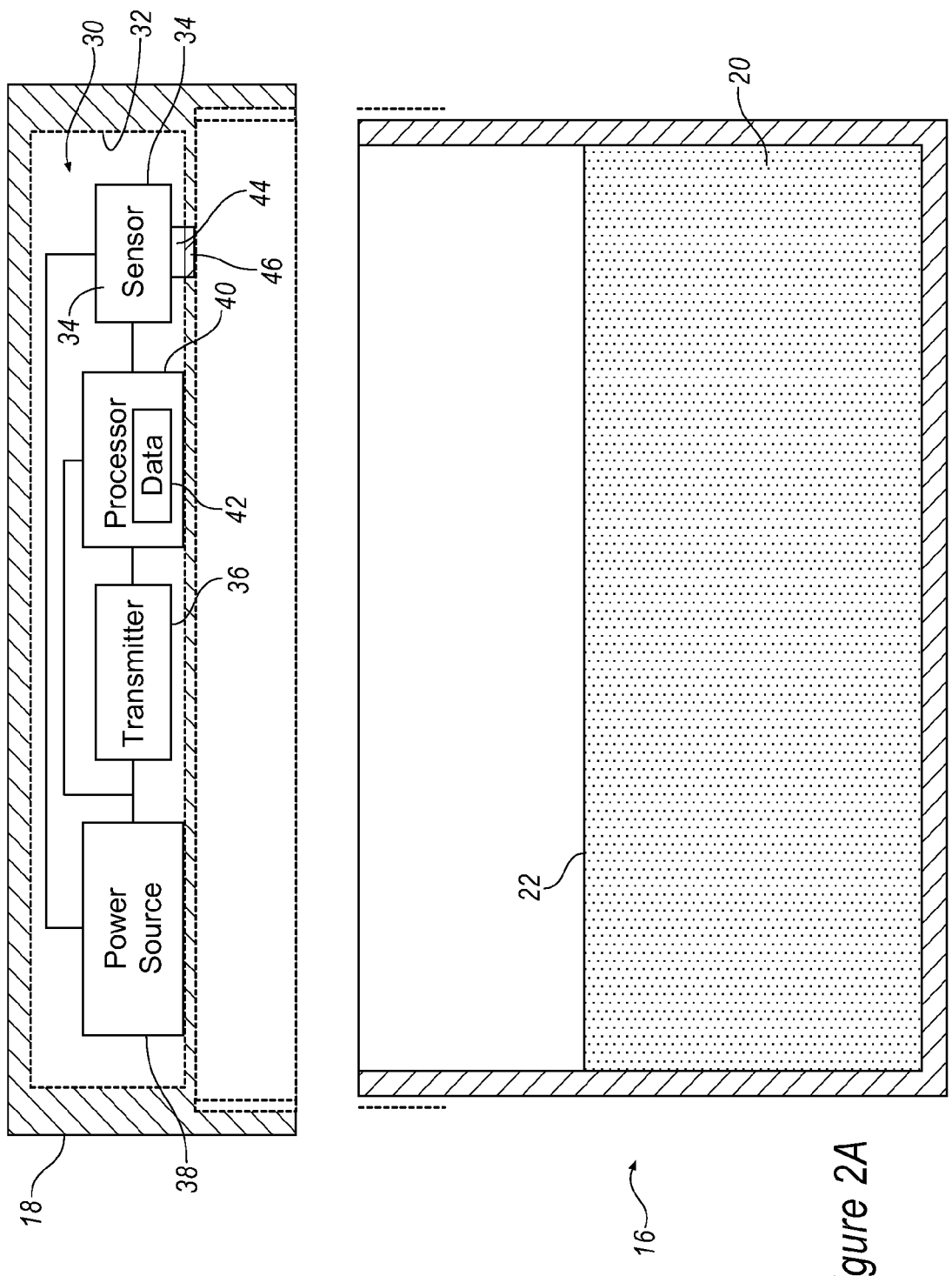
FIG. 2A is a partially schematic side, cut away, exploded view of the container of FIG. 2 showing the lid removed from the container.

Referring to FIGS. 2 and 2A, a container 20 may be provided with an attribute sensing device 30. Attribute sensing device 30 may be configured to determine at least one attribute of the substance 20 that is disposed in container 16. The attribute sensing device 30 may advantageously be provided in the lid 18 of the container 16, such as in a compartment 32 formed in the lid. Providing the sensor in the lid 18 may be advantageous for locating the sensor as well as for making the attribute sensing system 30 easily transfer to a different container. Alternatively, for some purposes, the attribute sensing device may be wholly or partially disposed outside of the container 16.

Moreover, in a storage and consumption environment 10, multiple containers 16 may each be provided with an attribute sensing device 30 to independently determine at least one attribute of each substance 20 contained in each container. Furthermore, some containers 16 may have more than one attribute sensing device 30, each sensing a different attribute of the substance 20 in the container. A control unit 24, illustrated in FIG. 1 and discussed later herein, may be provided to receive and process data from multiple containers 16. Control unit 24 may include a receiver, not shown, a display 26 and a control interface 28, each described later.

Referring again to FIGS. 2 and 2A, in one exemplary approach, attribute sensing device 30 may include a sensor 34, a transmitter 36, a power source 38, a processor 40, and at least one element of data 42. Sensor 34, processor 40, and transmitter 36 are communicatively coupled. Power source 38 may provide electrical power to sensor 34, processor 40, and/or transmitter 36 through electrical transmission wires connected thereto.

Sensor 34 may include a sensing capability configured to measure an attribute of the substance 20 and an output capability to output a reading of the sensor 34 to the processor 40. In the example illustrated in FIGS. 2 and 2A, sensor 34 may be configured to sense the distance ($\Delta$) between sensor 34 and a surface 22 of substance 20. Sensor 34 of attribute sensing device 30 may be attached to container 16 at a fixed reference point to provide consistent measurements of distance $\Delta$. In the illustrated exemplary approach, the reference point may be associated with lid 18. The reference point may represent the uppermost limit of surface 22, such as a fill line of container 16. The amount of substance 20 may be determined based on the measured distance $\Delta$ in relation to the physical shape of container 16.

Sensor 34 may utilize any of a number of sensing techniques. In one exemplary approach, sensor 34 employs an acoustic sensing technique to measure the distance $\Delta$. A sensor 34 using an acoustic sensing technique may include an ultrasonic generator, an ultrasonic receiver, a timer, and a processor, not shown. An ultrasonic pulse or plurality of pulses may be generated and directed at substance 20. The pulse may reflect off the surface of substance 20 and be collected by the receiver. The timer may record the time between the generation and reception of the pulse. Distance $\Delta$ may be calculated based on the recorded time with respect to the speed of sound.

In another exemplary approach, sensor 34 may employ a capacitance sensing technique to measure the distance $\Delta$. The capacitance sensing technique provides a first capacitance plate and an electrical charge sensing element. Surface 22 of substance 20 acts as a second capacitance plate. The first plate is charged to create an electrostatic field. The field is affected by distance $\Delta$ to surface 22 in a manner that may be perceived by the sensing element. The sensed difference in the field may be used with a calculation or look-up table to determine distance Δ.

Still other sensing techniques may be used to sense the distance Δ. Alternatively, the sensor 34 may measure other attributes of the substance 20, such as volume, color, temperature, pressure, humidity, texture, and presence of gas chemicals. Sensing technologies that may be used by the sensor 34 include inductive sensing, resistive sensing, evaporative gas sensing, image sensing, pressure sensing, float sensing or other mechanical sensing, strain gauge or force sensing, optical recognition, spectroscopy, thermal imaging, etc.

It is to be understood that the list of attributes being sensed and technologies for sensing herein is not an exhaustive list. Additional sensing technologies may also be suitable, e.g., inductive sensing, resistive sensing, evaporative gas sensing, image sensing, pressure sensing, float sensing or other mechanical sensing, strain gauge or force sensing, etc. An inductive sensor may pass a current through an inductive loop creating a magnetic field. A metal substance 30 in the presence of the magnetic field produced by the loop may effect the inductance of the loop. The change in inductance may be sensed by the inductive sensor to determine the proximity of the substance 30 to the sensor 54. A strain gauge sensor may measure deformation or strain of the container 16 cause by the substance 30. A foil pattern may be deformed by the strain thereby altering its resistive properties. The change in resistance may be measured and used to determine an indication of the amount of the substance 30. A float sensor may be used with a liquid substance 30. A float may ride against a vertically disposed set of contacts. The float may therefore complete a circuit at a set of contacts corresponding to the surface level 32 of the substance 30. A pressure or force based sensor such as a scale may be used to determine the weight of the substance 30. The weight may be used along with a known density of the substance in order to determine an indication of the amount of the substance 30.

An aperture 44 may be provided in the compartment 32 in the lid 18 to facilitate operation of sensor 34. In another exemplary approach, aperture 44 may be covered with a protective element 46. Protective element 46 may further be transparent to the sensor 34 or may, for example, comprise a lens for an IR or optical based sensor 34.

The sensor 34 provides an output relating to the attribute of the substance 20 for use by the processor 40. In one exemplary approach, the output capability of the sensor 34 may simply be the communication wires connecting sensor 34 to the processor 40 and/or to the transmitter 36. However, in other exemplary approaches, output element may format or adapt the reading of sensing element prior to output. For instance, the output of sensing element may require analog to digital conversion which may be provided by an analog to digital converter of output element.

The processor 40 of attribute sensing device 30 receives the output of the sensor 34. Processor 40 may be a general purpose microprocessor. Such a processor may provide a predefined instruction set that can be used to program device 30 with very flexible control software. However, in another exemplary approach, processor 40 may merely include circuitry to allow the level reading of sensor 34 to be transmitted by transmitter 36.

Processor 40 may include data 42, which may include at least one element of metadata. In one exemplary approach data 42 may be permanently embedded in processor 40. For instance data 42 may be a metadata element that provides an identifier. The identifier may identify the device 30, the container 16, the substance 20, or a class of the substance 20. Moreover, in a storage and consumption environment 10 including a plurality of containers 16, the identifier may uniquely identify a particular attribute sensing device 30. In another exemplary approach, some or all of data 42 may be dynamically modifiable. Processor 40 may include a memory storage device such as flash memory, an EEPROM, etc., which holds data 42. Attribute sensing device 30 may additionally include a receiver to receive new data 42.

Data 42 is not limited to being only an identifier and may include many other possible items. Data 42 may include an indication of a prior attribute measurements of the substance 20. The prior measurement may be compared to the current measurement to allow for a determination of a status change in the measured attribute of the substance 20, such as a change in volume, temperature, color, pressure, humidity, or weight.

Data 42 may provide an indication of a chemical component of the substance 20. For instance, it may be desirable to know the chemical composition of the substance to make decisions regarding the environmental conditions of the substance 20, among other reasons. Data 42 may include range information for the attribute indicating what are acceptable and unacceptable measurements of the attribute or what measurement levels trigger a notification to the control unit 24, a notification to a user, or another activity. These environmental conditions, for example ambient temperature, can be sensed with the sensors mounted on the outer surface on the lid, or communicated from other external sensors.

Data 42 may include date and time values such as a date and time that the container 16 was first opened, a date and time that the container 16 was last opened, a date and time that the substance was processed or packaged at a processing facility. Data 42 may include manufacturing or processing information such as a name of the producer of the substance 20, manufacturing place of the substance 20, a trade name of the substance 20, a generic name of the substance 20, an identifier of the processing facility that processed the substance 20, a batch number of the substance 20. Data 42 may include nutritional and health information such as an indication of the nutritional attributes of the substance 20, an indication of the presence of allergens associated with the substance 20, and an indication of a dosage of the substance 20.

Data 42 may provide information for use in the determination of one attribute of a substance from the measurement of one or more other attributes by the sensor 34. For example, the amount of the substance 20 may be calculated or determined from a lookup table mapping the output of a sensor 34 that measures distance to the amount of the substance 20. Data 42 may be used to regulate and track usage or aging of the substance 20 by providing a history of the measurement of attributes of the substance 20. The data 42 may include an indication of a permitted user of the substance 20, information about replacement of the substance 20, or hyperlinks or contact information for further information about the substance. As will be discussed in more detail below, an attribute sensing device 30 may include additional sensors and accessory modules and may be in communication with other attribute sensing devices and databases. It should be noted that additional sensors may be or may not be within the container to sense environmental variables Accordingly, data 42 may provide an indication of an ideal environmental condition of the substance 20, an output from an additional sensor, or a control parameter for an accessory module.

Processor 40 processes the output of the sensor or passes the output of the sensor to the transmitter. The processor may also provide some of the data 42, such as the identifier, to the transmitter 36.

Transmitter 36 receives the output of the processor 40 and may transmit information about container 16. Transmitter 36 may communicate wirelessly with receiver to transmit the information about container 16. In one exemplary approach, the communication between transmitter 36 is unidirectional with all transmissions originating from transmitter 36. However, other exemplary approaches may include a receiver transmitter 36 for implementing bi-directional communication.

Transmitter 36 may use various transmitting technologies. In one exemplary approach, transmitter 36 may be a radio frequency (RF) transmitter. RF transmitters emit signals in the radio frequency range of the electromagnetic spectrum. Within the domain of RF transmitters, any of a number of RF transmission standards may be employed by transmitter 36. The RF transmission standard generally defines the signal strength, frequency, data throughput, and communications protocol. Low power RF standards, such as Bluetooth®, Zigbee®, Wibree™, enOcean®, Z-wave®, etc., are ideally suited for attribute sensing device 30. In other exemplary approaches requiring greater data rates or transmission range, a radio frequency transmitter operating according to the wi-fi or wi-max transmission standards may be employed.

In yet another exemplary approach, transmitter 36 may be a radio frequency identification (RFID) circuit. In such an approach, an RFID circuit may act as both transmitter 36 and power source 38. The RFID circuit may include an antenna for transmitting RF signals. The antenna may also inductively generate electrical power when in the presence of an operating RFID reader.

In another exemplary approach, transmitter 36 may be an IR transmitter. The IR transmitter may include an IR diode that can produce an IR signal. The IR signal may then be received by a photoelectric receiver included with control unit 24.

In yet another exemplary approach, transmitter 36 may be an acoustic transmitter. For instance, transmitter 36 may be a speaker configured to audibly transmit the output of sensor 34. Transmitter 36 may announce the amount of substance 20 contained in container 16.

While not depicted in the drawing figures, transmitter 36 may require an aperture in outer portion of lid 18. For instance, a non-metal aperture in a metal lid 18 may facilitate the transmission of radio frequency signals. Similarly, an IR transmitter may require a transparent or translucent aperture for the passage of the infrared signals and may further include a lens with the aperture.

The power source 38 may provide electrical power to transmitter 36, sensor 34, and processor 40. The storage and consumption environment 10 generally cannot accommodate a plurality of containers 16 wired to a power source 38. Accordingly, power source 38 may be a wireless power source allowing attribute sensing device 30 to be self-contained and in some exemplary approaches, self-sufficient. Moreover, a variety of wireless power sources may be employed as power source 38.

Some examples of wireless power sources include a battery, a solar cell, a fuel cell, an RFID circuit, as well as energy harvesting techniques. Batteries, such as dry cell batteries, are well known for providing power to devices that cannot accommodate being wired to a power source. Dry cell batteries typically use a chemical reaction to provide power. As a result, batteries may become depleted over time. Accordingly a device with a battery power source may need to allow for replacement of the battery or may need to be disposable. A battery based power source may be implemented when the device 20 needs to be activated at arbitrary times as well as when the device 20 needs to be continuously activated. A battery may further act as a supplemental power source to other power sources discussed below. Solar cells, or photovoltaic cells, are known for implementing the photovoltaic effect to convert light energy into electrical energy. A cell disposed on an outer portion of the lid 18 could absorb light from the environment when removed from a containing unit 12.

The power source 38 may be a power storage device, an energy harvesting device, or a combination of both. Exemplary energy storage devices include a battery, a flywheel, or a capacitor. Energy harvesting devices include power generators and mechanical energy harvesting generators.

Power generators include solar cells, fuel cells and RFID circuits. Alternatively, a thermoelectric generator may rely on a temperature gradient between two conducting materials to produce a current.

Energy harvesting techniques may include an inductive generator, a piezoelectric generator, a thermoelectric generator, a kinetic micro-generator an electrochemical generator and combinations thereof. Energy may be harvested, for example, from motion, forces, temperature gradients, ambient sources or a combination thereof.

An inductive generator may generate power from the movement of the lid. A source of magnetic flux may be associated with one of the lid and the jar and a flux responsive device may be associated with the other of the lid and the jar. The source of magnetic flux may be one or more permanent magnets attached to a surface of container 16, such as the rim of container 16, The flux responsive device may be a conductive coil extended along a circumferential surface of the lid, such as a lip portion of lid 18 that overlaps the rim of container 16. Spinning lid 18, which may be necessary to unscrew a screw-on lid, passes the coil through the magnetic fields provided by the magnets, which in turn induces a voltage between the ends of the coils.

A piezoelectric generator employs a material that demonstrates a piezoelectric effect. Applying a force or strain to the piezoelectric material may produce electrical energy that can be used by the elements of attribute sensing device 30.

A thermoelectric generator may rely on a temperature gradient between two conducting materials to produce electrical energy.

Kinetic micro-generators may employ a moving element such as a pendulum, piston, flywheel, etc. to charge a capacitor which may in turn provide an electrical output. The moving element may cause an attached magnet to oscillate in the presence of a coil, which in turn charges the capacitor. The capacitor may then be discharged at the time the device 20 needs to be powered. A kinetic micro-generator may use piezoelectrics to harvest energy from ambient mechanical vibration. attribute sensing device 30.

A kinetic micro-generator may convert ambient vibration into electricity by placing magnets along a beam that is configured to vibrate in response to the ambient vibration. As the beam vibrates, the magnets move in response and move relative to a coil in proximity to the beam and the magnets. As the magnets move relative to the coil, electro-magnetic induction causes current to flow in the coil. The current flow is the electric energy.

Solar cells and kinetic micro-generators are examples of power sources that derive their power from the natural ambient environment.

Power source 38 may combine a power generator with power storage to provide access to power at times when the generator is not generating power, such as to provide a controllable delay in the activation of the sensor from the time that the power is generated.

Power source 38 may provide power in response to accessing the substance of the container 16 or changes in the environment of the container that result in the generation of power. Moreover, the time that container 16 is accessed is an ideal time to power attribute sensing device 30 to determine such attributes indicative of the amount of substance 20 or the quality of the substance 20 because container 16 is generally accessed for the purpose of removing a portion of substance 20 and using the substance for some purpose. Therefore, attribute sensing device 30 may be able to not only determine the attribute of substance 20, but also may be able to calculate the change in the attribute with each access to container 16.

The choice of power source 38 may affect the specific time that attribute sensing device 30 determines the amount of substance 20. For instance, a solar cell based power source may generate electrical power when container 16 is removed from an enclosed area such as refrigerator 12 or cabinetry 14 and exposed to a light source. A piezoelectric generator may generate electrical power as a result of the force or strain place on lid 18 during its removal. An RFID circuit may generate electrical power when exposed to an RFID reader. A thermoelectric generator may generate electrical power due to the temperature differential created when a container 16 is removed from refrigerator 12. While the power sources 38 just discussed may be able to automatically generate electrical power during the opening or closing of container 16 and therefore also supply an access event sensing function, a battery based power source 38 may require the inclusion of an additional element to perform an access event sensing function in attribute sensing device 30 such as a switch or an accelerometer, described below with reference to FIG. 6, in order to sense the opening or closing of container 16.

In summary, the power source 38 provides power to the attribute sensor 34 which provides an output indicative of the attribute to the processor 40. The processor 44, also powered by power source 38, further processes the output of sensor 34 for the transmitter 36 or passes on the output of sensor 34 to the transmitter 36. The processor 44 may output additional information, such as an identifier, to the transmitter 36.

Control unit 24, illustrated in FIG. 1, may be provided with a receiver, not shown, to receive and process data from multiple attribute sensing devices 30. The control unit 24 may store, process and/or display the information received from the attribute sensing devices 30 to produce additional information. The control unit 24 may convert received attribute information to a different type of attribute information. For example, an attribute sensing device 30 may output distance Δ to control unit 24 and control unit 24 may calculate the amount of substance 20, the time for replacement of the substance, or the calories of substance consumed since the last measurement based on distance Δ. Control unit 24 may aggregate data from a plurality of attribute sensing devices to generate additional information such as information about the inventory, quality, life cycle of various substances in the storage and consumption environment 10.

Control unit 24 may provide a visual display 26 or other output device for communicating information derived from attribute sensing devices 30, including derived inventory, status reports, recommendations, warnings and other data.

Control unit 24 may further have a control interface 28, such as a keypad, for inputting additional data and for requests for reports and information. Display 26 and control interface 28 cooperate to provide a user with facilities to control and interact with control unit 24 and sensing devices 30. In addition, control unit 24 with display 26 and control interface 28 may function as user interface for refrigerator 12 or any other appliance like cooktops, ranges, dishwashers, washers, dryers, and the like, allowing the control unit 24 to send command that effect the cycle of operation of the appliance. Interface 28 may display the amount of substance in container 16 or cycle information about the cycle of operation of the appliance.

For example, when introducing a new container 16 with an attribute sensing device 30 into the storage and consumption environment 10 or when transferring an attribute sensing device 30 to a new container 16, it may be desirable to associate data 42, such as an identifier, on the attribute sensing device with the new container 16 or the new substance 20. Control unit 24 may control the association of identifiers to particular containers 16 or substances 30. Control interface 28 may be used for entering the new data. The data may be entered manually or the control interface 28 may include a bar code reader or other device for reading information from the container 16 or the sensing information from the substance 20. If the attribute sensing device is equipped for two way communication, then the data entered at the control interface 28 may be transmitted to the attribute sensing device 30 and stored in the data 42. Moreover, in a kitchen 10 with multiple containers 16, display 26 may show the amounts of substance for each container. As discussed below, data may include an identifier to assist the control unit 24 and the user in determining the amount of substance associated with a particular container 16. Control unit 24 may allow a user to associate an identifier with a particular substance. For instance, if container 16 may be refilled with multiple different substance, control unit 24 may allow the user to associate a name or label with an identifier.

Figure 3:
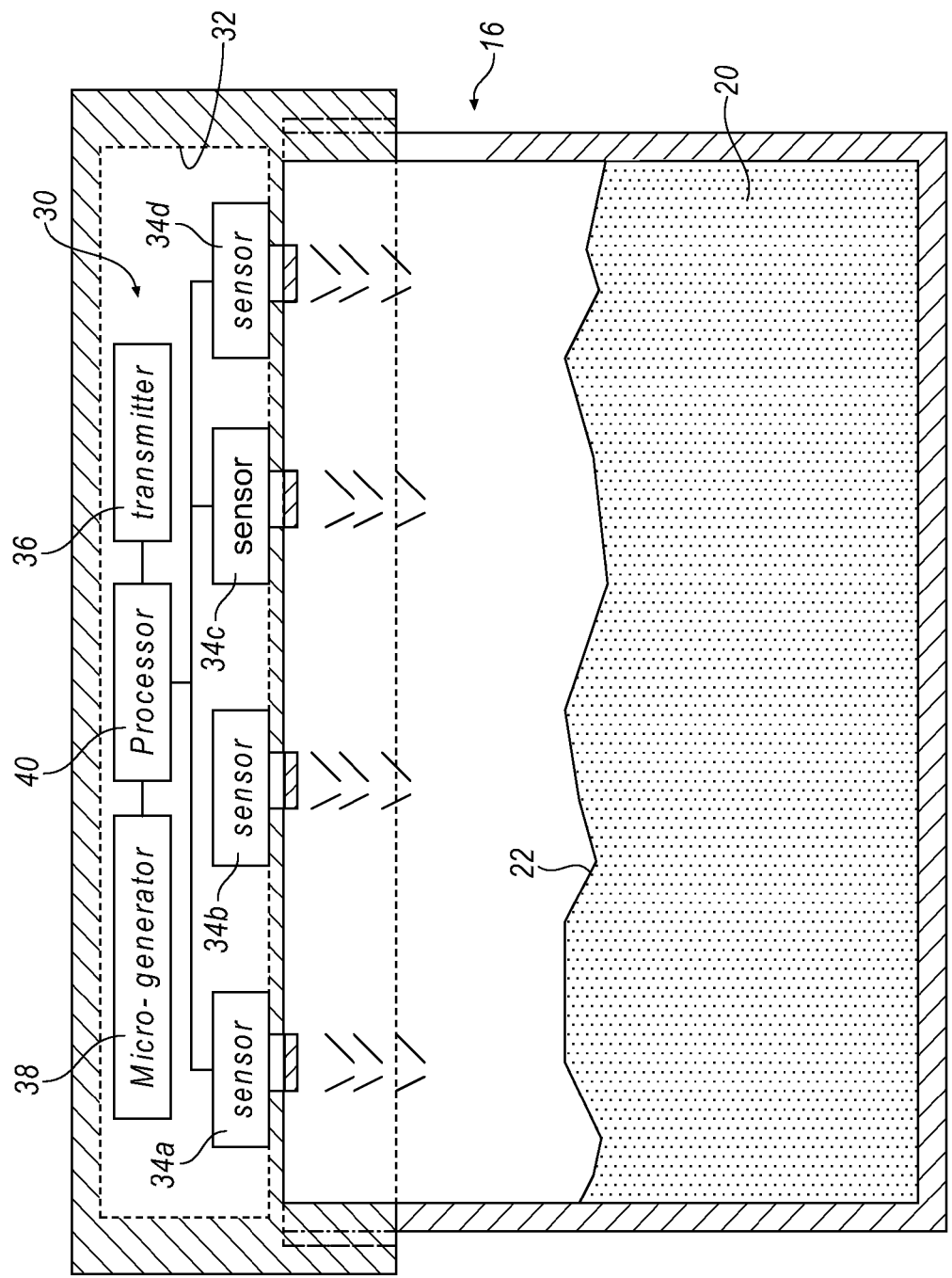
FIG. 3 is a partially schematic side, cut away, exploded view of a container including an alternate device to sense an attribute of the substance in the container.

FIG. 3 illustrates another exemplary attribute sensing device 30a. Non-liquid substances 30 may have a non-uniform surface 22. Accordingly, sensing distance Δ from multiple positions may allow for a more accurate determination of the amount of substance 20. FIG. 3 provides an example of an attribute sensing device having multiple sensors 34a, 34b, 34c and 34d to determine the height of substance 20 at 4 different locations.

Alternatively, other types sensors may be used such as those that detect resistivity, conductivity, light transmisivity, conductivity and diffraction, may be used to capture an indication of amount.

Figure 4:
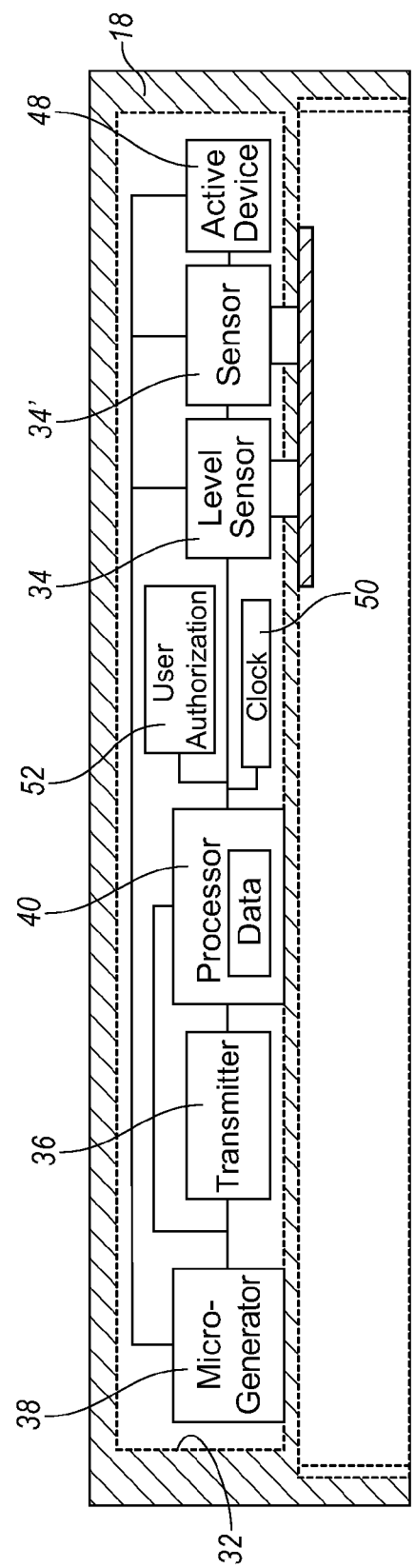
FIG. 4 is a partially schematic side, cut away view of a container lid having an alternative device to sense a plurality of attributes of a substance.

FIG. 4 illustrates another exemplary attribute sensing device 30b. The attribute sensing device 30b may have an additional sensor 34' and accessory devices such as a motor 48, a clock 50, and a user authorization module 52. Additional sensor 34' may be used to sense a second attribute of the substance in the container or may be used to supplement the information obtained by sensor 34. For example, sensor 34 may be used to sense one or more attributes indicative of the amount of substance 20 and the additional sensor 34' may sense one or more attributes indicative of the freshness or quality of substance 20.

Motor 48 is one example of an accessory device that may be included with attribute sensing device 30. Other accessory devices will be discussed later herein. Motor 48 may manipulate the position of sensor 34' with respect to container 16 and substance 20 or alternatively may be used to manipulate the substance 20.

Clock 50 may allow for the determination of the access times of container 16. The access times may be used to generate a usage history. Access times may also be used in cooperation with other date values such as the processing or production date of substance 20 in order to determine the freshness or quality of substance 20. Clock 50 may further allow the tracking of the amount of time that lid 18 is removed from container 16. Such information may further be useful in determining the freshness or quality of substance 20. User authorization device 52 may associate an individual to an access of container 16 and also to the removal of substance 20 from container 16. User authorization device 52 may provide an interface on an external surface of lid 18, e.g., a key pad, for accepting a user identification number. However, in another exemplary approach, attribute sensing device 30 may further include a receiver, not shown, for bi-directional communication with control unit 24.

It will be appreciated that different transmitters 36, sensors 34 and power sources 38 may be appropriate for different purposes. Storage and consumption environments 10 will have different infrastructures and different transmission conditions which can affect the type of transmitter that may be appropriate. For some applications, a transceiver may be required. Different types of sensors 34 may be required for different storage and consumption environments 10, for different types of users and for different substances 20. Different power sources 38 may be required for different measurement purposes, for different types of containers 16 and for different environments. For example different containers may require different types of micro-generators or at least function better with different types of micro-generators. For example, a screw on lid may require a different type of generator than a flip top box or a snap fit plastic containers.

While many different attribute sensing devices may be needed from time to time, it may not be convenient or cost effective to mass produce all needed permutations and combinations of these components. It therefore would be beneficial to have a modular system of components from which a desired attribute sensing device 30 may be assembled as and when needed to reduce inventory requirements while maintaining high availability.

FIG. 5A schematically illustrates a simple example of a modular attribute sensing device 100a having a power module 110a, a transmitter module 120a, and a sensor module 140a. Power module 110a includes a power source 112a, such as a battery. Transmitter module 120a includes a transmitter 122a, a processor 124a, and an interface 128a for connection with the other modules. Sensor module 140a includes a sensor 142a such as a temperature sensor.

The transmitter module 120a may be an integrated circuit. Transmitter and transceiver circuitry has been reduced, for example for RFID tags, to devices as small as a quarter square millimeter (0.25 mm$^2$) and as thin as five hundredths of a millimeter (0.05 mm). Such devices often include a radio-frequency circuit, an antenna, a processor, memory in the form of ROM, a current rectifying circuit and a power and/or synchronizing circuit, not shown in the drawing.

Sensor module 140a and power module 110a may be made of discrete components or may be manufactured using an integrated circuit such as a Micro-Electro-Mechanical Systems (MEMS). MEMS, sometimes referred to as a system-on-a-chip may be used to include the sensor 142a, in the case of the sensor module, or a power source 112a such as a battery or microgenerator in the case of the power module, plus any other required circuitry on a single silicon chip. If required, the sensor module chip or the power module chip may also include, for example, a processor, memory, a current rectifying circuit and a power and/or synchronizing circuit, not shown in the drawing.

The processor 124a of the transmitter module 120a may be used for the control of the sensor 142a of the sensor module 140a and to process the output of the sensor and/or to regulate the power source 112a of the power module 110a. Alternatively, the sensor and power modules may include their own processor for these purposes. The data associated with any module may be ROM memory only or may include some form of writable memory.

Similarly, any of the power, transmitter, sensor, auxiliary, active, processing, and interface modules described below may be made of discrete components or integrated components.

FIG. 5B illustrates another example of a modular attribute sensing device 100b having a power module 110b, a transmitter module 120b a sensor module 140b, an interface 128b for connection with the other modules, and an accessory module 150b. Power module 110a has a microgenerator 112b for a power source. Transmitter module 120b includes a transceiver 122b, a processor 124b with a clock 130b, and a battery 132b to power the processor and/or the transceiver when the microgenerator 112b is not functioning. Sensor module 140b has a level sensor 142b. Accessory module 150b has an active device 152b, such as a motor.

FIG. 5C illustrates another example of a modular attribute sensing device 100c having a power module 110c, a transmitter module 120c, and two sensor modules 140c and 140c'. Power module 110c includes a microgenerator 112c with power storage 116c. Transmitter module 120c includes a transmitter 122c, a processor 124c with a user interface 134c and an interface 128c for connection with the other modules. Sensor module 140c includes a level sensor 142c and sensor module 140c' includes a temperature sensor 142c'.

FIG. 5D illustrates yet another example of a modular attribute sensing device 100d having a power module 110d with a battery 112d, a transmitter module 120d described below, a sensor module 140d with a gas sensor 142d and an accessory module 150d with an fan 152d. Transmitter module 120d includes a transceiver 122d, a processor 124d with a user authorization or a user authentication module 134d, and a battery 132. In this example, each of the modules is provided with a bus 180 so that they can be interconnected in any sequence. Each module 110d, 120d, a40d and 150d may include both a male and female connector in order to daisy chain a set of modules. In a variation of this example, each of the interfaces provides wireless communication to all of the other modules in the modular attribute sensing device.

FIG. 5E illustrates another example of a modular attribute sensing device 100e having a power module 110e, a transmitter module 120d described below, a sensor module 140d and an interface module 160 for interconnecting with each of the modules. In this example, the interface module provides a common bus provided with a plurality of connections for connecting to other modules. All or most connections are provided between the interface module and the other modules, rather than from the modules to one-another. Therefore each module other than the interface module may include a single connector, either male or female, for connecting to the interface. This approach may limit the maximum number of modules to only the number of connector ports available on the interface module. Alternatively, the number of modules may be increased by ganging two or more interface modules. Additionally, this may provide for simpler and specialized connectors given that each type of module generally requires a different set of wire connections appropriate for power, data, antenna, and other connectors. In one exemplary approach, a standardized connector may be employed such as USB, db9, rj45, etc.

FIG. 5F illustrates still another example of a modular attribute sensing device 100f having a power module 110f, a transmitter module 120f with a transmitter 122f, a processor module 170f with a processor 124f, a sensor module 140f, an interface 128f for connection with the other modules, and an accessory module 150f.

Figure 6:
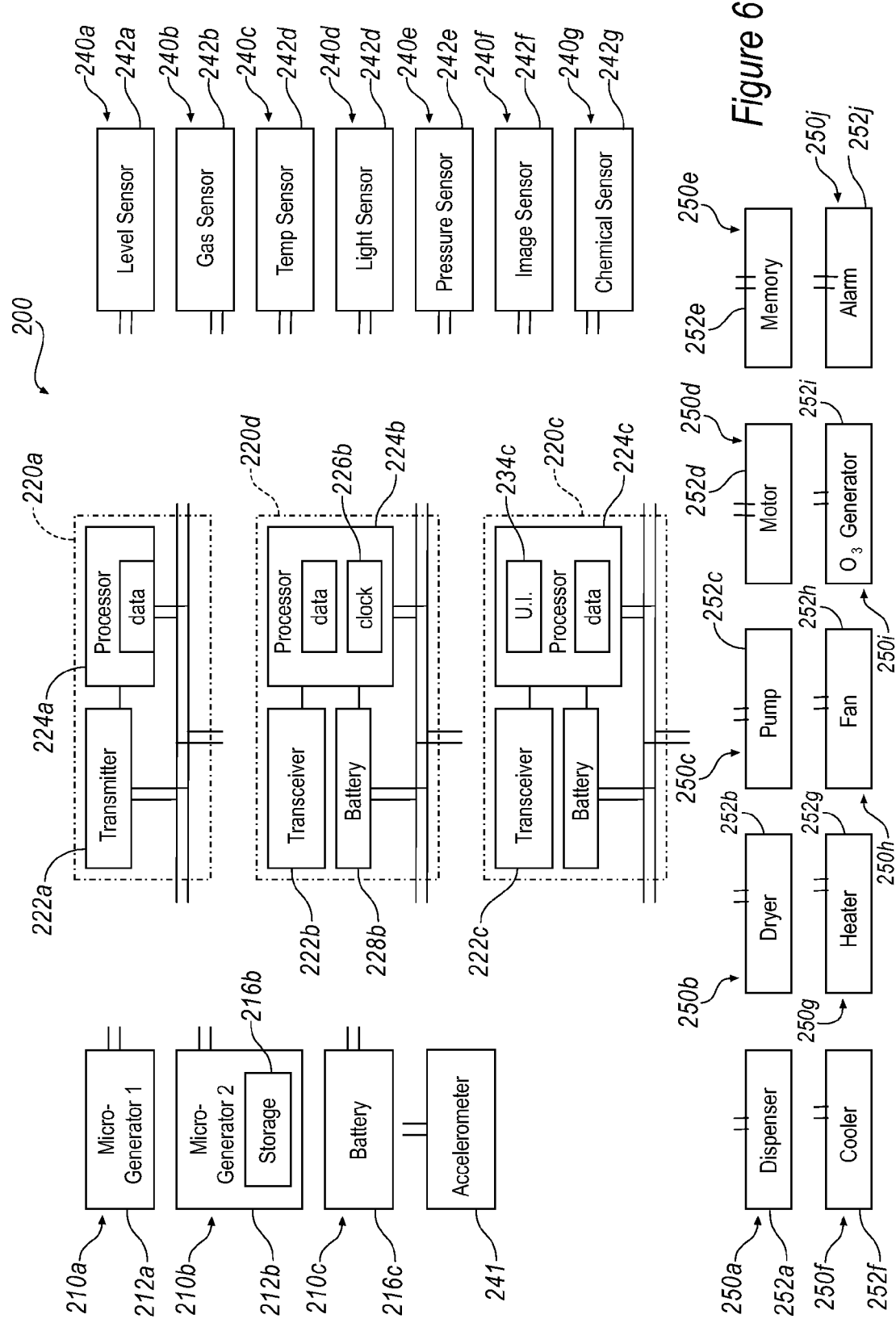
FIG. 6 is a schematic view of a modular system for creating modular devices for sensing attributes of substances in containers.

It will be appreciated that FIGS. 5A-5F provide alternative architectures for modular attribute sensing devices. FIG. 6 provides an example of a modular attribute sensing system 200 for assembling a variety of modular attribute sensing devices according to the architecture of FIG. 5B. Modular attribute sensing system 200 may have a plurality of alternative power modules 210a, 210b and 210c which may each be used with any of several transmitter modules 220a, 220b and 220c.

For example, power module 210a may have a microgenerator 212a such as a piezoelectric generator which may be suitable for attribute sensing devices that are intended to take measurements when the container is being moved. Power module 210b may have a microgenerator 212b such as a solar collector with on board power storage 214b and may be used for attribute sensing devices that are exposed to occasional light. Power module 210c may have a battery 214c and may be suitable for use where no power generation means will be available on a reliable basis. Where a battery is used for power, it may be desirable to detect an access event with an accelerometer module 241.

Transmitter module 220a has a basic transmitter 222a and processor 224a while transmitter module 220b has a transceiver 222b, a processor 224b with a clock 226b, and power storage 228b. Transmitter module 220c has a transceiver 222c, a processor 224b with a user interface 232c, and a battery 228b.

A variety of sensor modules 240a-240g having sensors 242a-242g may be selected for connection to any of the transmitter modules 220a, 220b and 220c. For example, the modular attribute sensing system 200 may include a choice of a level sensor 242a, a gas sensor 242b, a temperature sensor 242c, a light sensor 242d, a pressure sensor 242e, an image sensor 242f, a chemical sensor 242g, etc. A variety of accessory modules 250a-250j having active devices 252a-252-j may be selected for connection to any of the transmitter modules 220a, 220b and 220c. For example, the modular attribute sensing system 200 may include a choice of a dispenser 252a, a dryer 252b, a pump 252c, a motor 252d, an antenna 252e, a cooler 252f, a heater 252g, a fan 252h, an ozone generator 252i, an alarm 252j, and a valve, not shown, etc.

Figure 7:
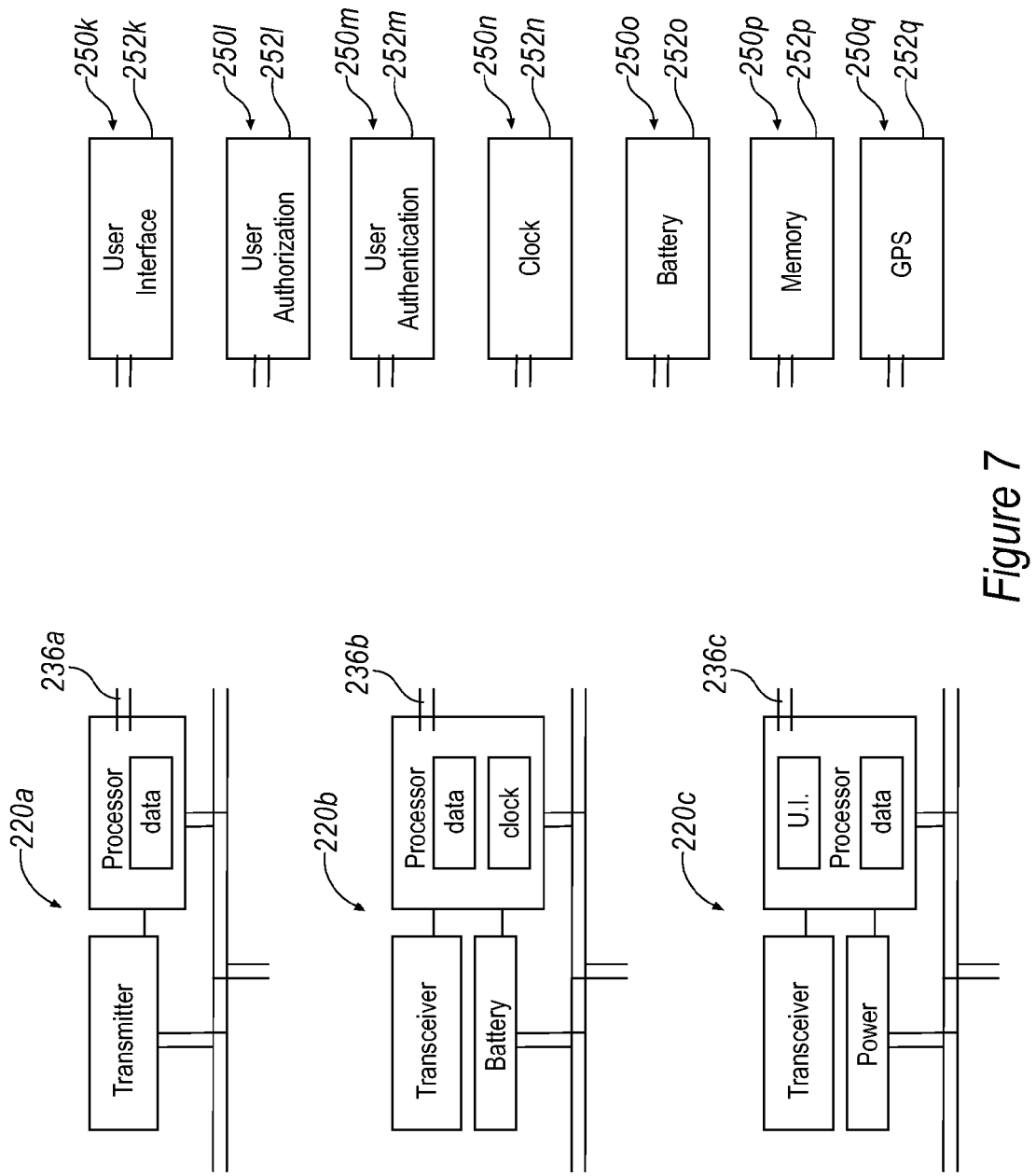
FIG. 7 is a schematic view of a portion of an alternative modular system for creating modular devices for sensing attributes of substances in containers.

As shown schematically in FIG. 7, still other accessory modules 250k-250q may be selected for connection to the processors 224a, 224b, and 224c or otherwise to the transmitter modules 220a, 220b and 220c. The accessory modules 250k-250p may have, for example, a user interface 252k, a user authorization device 252l, a user authentication device 252m, a clock 252n, a battery 252o, memory 252p, or a GPS device 252q.

Figure 8:
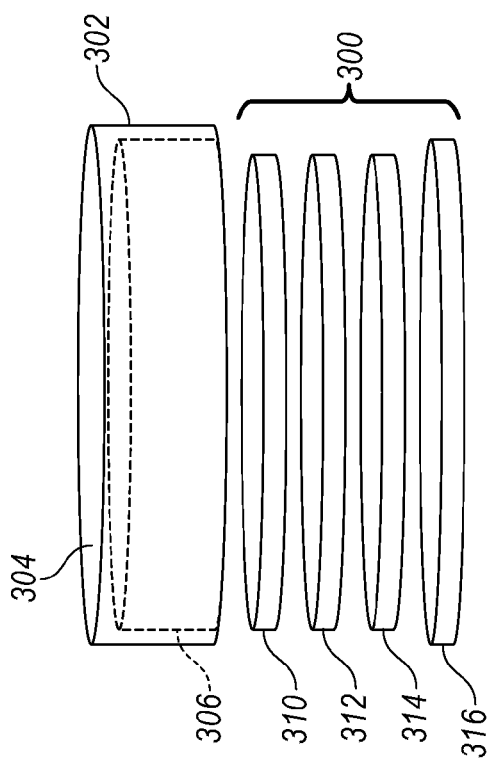
FIG. 8 is an exploded view of a modular device for sensing attributes of substances in containers.
Figure 9:
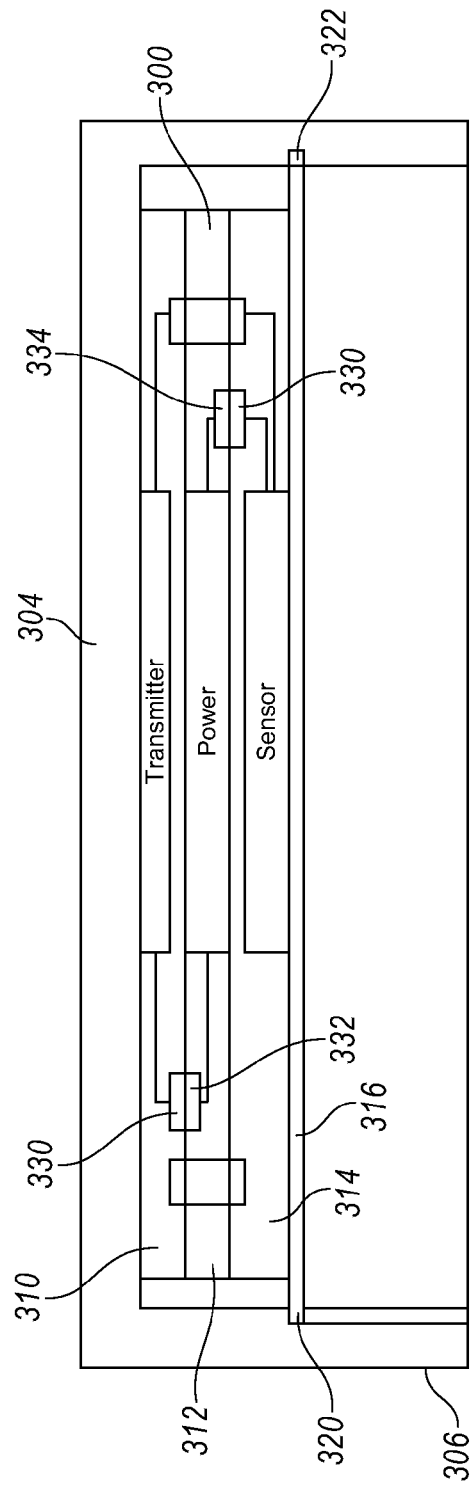
FIG. 9 is a sectional view through a container lid and the modular device of FIG. 8.

Refer now to FIGS. 8 and 9 illustrating an example of a modular attribute sensing device 300 for installation in a screw on lid 302. The lid 302 has a top 304, and a threaded annular rim 306. In this example, a power module 310, a transmitter module 312, and a sensor module 314 have integrated components, such as MEMS devices provided on a disk shaped member. The modules are inserted within the rim 304 sequentially to abut against the underside of the top 304 of the lid 302 and against each other. The sensor module 314 is shown at the bottom of the stack of modules for ready access to the substance in the container, not shown in FIGS. 8 and 9. The transmitter module 310 is shown at the top of the stack of modules for better signal or for access to an antenna, not shown, on the exterior of the lid 302. The power module 310 is sandwiched between the other two modules.

A disk shaped cover module 316 abuts the sensor module 314 and secures the stack of modules to the lid 302, for example using a key and slot arrangement as shown at 320 and 322. The cover module 316 may be formed of a material transparent to the sensor in the sensor module 314 or may be provided with a suitable aperture, not shown, permitting the sensor access to the substance being measured.

Each of the modules 310, 312 and 314 is provided with appropriate contacts, such as contacts 330, 332, 334, and 336 for connecting the devices on each module 310, 312 and 314 with the devices on the adjacent devices. The modules 310, 312 and 314 may be provided with appropriate alignment features, not shown, to align the contacts. Alternatively, at least some of the contacts 330, 332, 334, and 336 may be in the form of abutting arcs so that precise angular alignment of the contacts is not required.

It will be appreciated that the assembly of the modular attribute sensing devices 100a-100f or modular attribute sensing device 300 may occur per order at a factory, at a retail store or at an internet or mail order assembly facility. Alternatively, assembly may occur at the storage and consumption environment 10.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims.

For example, some accessories may be preprogrammed to act in a particular manner based on the readings of the sensors. Accordingly, it is contemplated certain modules may require paring with other respective accessories in order to function properly. The device may include a receiver for receiving instructions for controlling the accessory modules. Similarly, the sensors may be programmed to sense at particular times or in response to particular events. The process may include a storage medium for storing the instruction and may further control the sensors and accessory modules according to the instructions. Instructions may be generated by the control unit 24 according to an interface provided thereby. For example, after assembling a set of modules, the control unit 24 may determine the included components and provide a custom interface for setting sensing timing or other characteristics of the overall systems.

Alternatively some components, such as a power and data bus, may be integrated into the container main body or the lid.

For example, the examples illustrated use a lid opening as an access event to generate power for the sensor and the transmitter. It is contemplated that for some applications, there is a dispenser mechanism that is used for accessing the substance in a container and the access event triggering the operation of the sensor is the operation of the dispenser.

In another instance, an access event may include amount sensing so that the dispenser may use the measurement of the sensed amount to accurately regulate a dispensing of a particular amount of substance. For example, in a dispenser for a laundry or dishwashing machine, one may need to dispense a precise amount of substance such as an additive provided for the wash bath used to wash fabric or dishes. The container or reservoir holding the substance might include an attribute sensor for sensing an amount attribute, a valve for opening and closing to selectively permit dispensing and a controller for controlling the operation of the valve in response to the measurement of the amount attribute. Alternatively, the dispenser may use a controlled pump, siphon, or container tipping system to controllably dispense substance. Thus the information received by the attribute sensor can be used by the dispenser to dispense the precise amount of substance. It is contemplated that for other applications, the access event will trigger operation of the sensor or the transmitter, such as by use of an accelerometer, but will not provide power to the sensor or the transmitter, which may either be powered by another device such as a battery or may be unpowered.

Furthermore, while the containers illustrated and described above are passive storage containers, it is contemplated that in some applications, the containers may be storing a substance while an operation is being performed on the container and/or substance, such as heating, cooling mixing, or shaking by an external device such as a stove, an oven, or a mixer. Thus, for example, the container may be a pot, a baking dish, or a mixing bowl having a lid or dispenser with a sensing system of one of the types described above. The sensor system may be used to monitor or control the cooking operation, such as to determine when an operation is complete or when some attribute has exceeded some pre-set limit.

Additionally, the sensor system may detect an undesired access or dispensing event which may be indicative of an undesired condition, such as leakage from a container, boilover, boil-dry, evaporation or access by mice or insects.

Additionally, some versions of the modular system described herein may be useful for multiple compartment containers, such as medicine containers as well as to non-portable containers, such as appliance additive dispensers, water heaters, water softeners, vehicular fluid storage compartments, and wash tubs.

A manufacturer may elect to cost optimize selected embodiments of modular devices by reducing the configurability, removing interfaces, combining components and the like. In this case, the modularity of the system is reduced or eliminated from the perspective of the physical assembly, but not eliminated from the overall system design and variety of product offering perspective. Modularity therefore comprises aspects of physical assembly modularity and functional modularity which is the capability to produce a variety of different modules having unique feature sets from a family of design modules comprised by a design library. Therefore a modular device is one that can have physical assembly modularity for allowing physical re-assembly or physical changes to the assembly. Alternatively, a modular device is one that can be populated from a variety of feature modules of the kind found in FIGS. 6 and 7 from a plurality of feature modules during the design phase and before the assembly phase of the modular device.

It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

The invention claimed is:

1. A modular device for determining attributes of a substance stored in a container, comprising:
a module interface;
at least one sensing module coupled to the module interface having an identifier and a sensor;
at least one accessory module coupled to the interface;
a transmitter configured to transmit the identifier and information derived from an output of the at least one sensing module;
a processor coupled to the module interface and the transmitter, and configured to control the at least one sensing module and the at least one accessory module;
a power source module connected to the module interface; and
a lid for removably closing the container, wherein the module interface is attached to the lid.

2. The modular device according to claim 1, wherein the at least one accessory module comprises at least one of a motor, a fan, a mixer, a humidifier, a dehumidifier, a dispenser, a sensor, a heater, a cooler, a user authentication device, a user authorization device, a user interface, a battery, memory, an antenna, a dryer, a pump, an ozone generator, a sound generator, a light generator, and a clock.

3. The modular device according to claim 1, wherein the at least one sensing module comprises an amount sensor.

4. The modular device according to claim 3, wherein the amount sensor comprises at least one of an acoustical sensor, an optical sensor, a capacitive sensor, an inductive sensor, a resistive sensor, an evaporative gas sensor, an image sensor, a pressure sensor, a float sensor, an infrared sensor, a strain gauge sensor, and a force sensor.

5. The modular device according to claim 1, wherein the at least one sensing module comprises a radiation sensor.

6. The modular device according to claim 5, wherein the radiation sensor comprises at least one of an optical sensor, a radio receiver, a heat sensor, a UV sensor, and an image sensor.

7. The modular device according to claim 1, wherein the at least one sensing module is configured to sense at least one of pressure, temperature, color changes, odor, texture, density, consistency, variability of color or texture, imaging, pH, viscosity, and the presence of specific gases.

8. The modular device according to claim 1, wherein the transmitter comprises at least one of a radio frequency transmitter, an acoustic transmitter, a visible light transmitter, an infra-red transmitter, and a radio frequency identification circuit.

9. The modular device according to claim 1, wherein the transmitter uses a standard comprising at least one of Bluetooth®, Zigbee® Wibree™, enOcean®, Z-wave®, wi-fi, Wireless USB, and wi-max.

10. The modular device according to claim 1, wherein the transmitter comprises at least one of a clock, a sound generator, a user interface, a user authentication device, a user authorization device, a power storage device, an antenna, and memory.

11. The modular device according to claim 1, wherein the power source module further comprises a power generator.

12. The modular device according to claim 11, wherein the power source module is configured to derive power from the natural ambient environment.

13. The modular device according to claim 11, wherein the power source module comprises at least one of a battery, a fuel cell, a solar cell, an RFID circuit, an inductive generator, a piezoelectric generator, a thermoelectric generator, and a kinetic micro generator.

14. The modular device according to claim 11, wherein the power source module further comprises a power storage device.

15. The modular device according to claim 11, wherein the power generator comprises at least one of an RFID circuit, an inductive generator, a piezoelectric generator, a thermoelectric generator, a solar cell, and a kinetic micro generator.

16. The modular device according to claim 15, wherein the power source module further comprises a power storage device.

17. The modular device according to claim 1, wherein the power source module comprises a power storage device.

18. The modular device according to claim 1, wherein the module interface comprises a bus communicating power and data.

19. The modular device according to claim 1, wherein:
the transmitter comprises a data processor capable of receiving an output of the sensor and a radio frequency transmitter capable of transmitting an indicator of the output and the identifier; and
the power source module comprises a micro-generator generating electrical power.

20. The modular device according to claim 1, further comprising at least two sensing modules, wherein the power source module and the transmitter are capable of being operably coupled to the at least two sensing modules at the same time.

21. The modular device according to claim 1, wherein the transmitter further comprises a data storage medium and at least one element of metadata contained therein, and wherein the transmitter is further configured to transmit at least one element of metadata with the information derived from the output of the at least one sensing module.

22. The modular device according to claim 1, further comprising an antenna operably connected to the transmitter for transmitting the information derived from the output of the at least one sensing module.

23. The modular device according to claim 22, further comprising a data storage medium and at least one element of metadata contained in the data storage medium.

24. The modular device according to claim 1, further comprising the container.

25. A modular device for determining an attribute value of a substance stored in a container, comprising:
a module interface configured to receive a plurality of modules and provide communication between modules when at least two modules are coupled to the module interface;
the at least two modules selected from: a sensing module having an identifier and a sensor, and an accessory module;
a transmitter configured to transmit information related to the modular device; and
a processor configured to evaluate data from at least one of the at least two modules for determining the attribute value.

26. The modular device according to claim 25, further comprising a cover module capable of being operably associated with the modular device, the cover module at least partially shielding the modular device from the substance in the container.

27. The modular device according to claim 26, wherein the cover module at least partially shields the at least two modules from the substance in the container.

28. The modular device according to claim 27, wherein the cover module at least partially shields the transmitter from the substance in the container.

29. The modular device according to claim 25, wherein the module interface comprises a bus communicating power and data between the at least two modules.

30. The modular device according to claim 25, further comprising a plurality of sensing modules, each having an identifier and a sensor, wherein the sensors of the plurality of sensing modules differ from each other by measuring a different attribute.

31. The modular device according to claim 25, further comprising a plurality of sensing modules, each having an identifier and a sensor, wherein the sensors of the plurality of sensing modules differ from each other by measuring the same attribute by a different process.

32. The modular device according to claim 25, wherein the transmitter further comprises at least two interfaces, each having connection points for operably connecting to any one of the at least two modules, and a bus for delivering data and power between the at least two interfaces.

33. The modular device according to claim 25, wherein each of the at least two modules further comprises at least two interfaces, each having connection points, and a bus for delivering data and power between the at least two interfaces.

34. The modular device according to claim 25, wherein the modular device is disposed within a container.

35. The modular device according to claim 25, wherein the modular device is disposed within a container lid.

36. The modular device according to claim 25, wherein the information related to the modular device comprises the identifier.

37. The modular device according to claim 25, wherein one of the at least two modules comprises the sensing module, and the information related to the modular device comprises information derived from an output of the sensing module.

38. A system for dispensing at least one substance from at least one portable container, comprising:
a source of power;
a lid having at least one sensing module receiving power from the source of power and having a sensor configured to sense at least one attribute of the at least one substance contained in the at least one portable container;
at least one accessory module receiving power from the source of power for selectively dispensing the at least one substance from the at least one portable container; and
a processor receiving power from the source of power and receiving data from the at least one sensing module, the processor being configured to evaluate data from the at least one sensing module and actuate the at least one accessory module for dispensing of the at least one substance:
wherein at least one of the processor, the at least one sensing module, and the at least one accessory module further comprises an identifier.

39. The system according to claim 38, wherein the at least one accessory module is disposed within a dispenser for dispensing substances into a home appliance process use environment.

40. The system according to claim 38, wherein the at least one accessory module is one of a pump, a valve, a siphon, and a tipping device.

41. The system according to claim 38, wherein the at least one attribute is indicative of an amount of the at least one substance.

42. The system according to claim 38, further comprising an interface module having connection points capable of operably connecting to the at least one sensing module, the source of power, and the at least one accessory module.

43. The system according to claim 42, wherein the interface module further comprises at least one of a data processor and power storage.

44. The system according to claim 38, wherein each of the at least one sensing module and the at least one accessory module further comprises at least one interface having connection points.

45. The system according to claim 38, further comprising a data storage medium and at least one element of metadata contained therein.

\* \* \* \* \*